(12) United States Patent
Kadotani et al.

(10) Patent No.: US 11,217,218 B2
(45) Date of Patent: Jan. 4, 2022

(54) SOUND ABSORBER AND PROJECTOR

(71) Applicant: SEIKO EPSON CORPORATION, Tokyo (JP)

(72) Inventors: Norikazu Kadotani, Matsumoto (JP); Ken Terai, Azumino (JP); Yoshiaki Iwatani, Azumino (JP); Masatoshi Tanaka, Azumino (JP); Shin Aruga, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 572 days.

(21) Appl. No.: 16/160,038

(22) Filed: Oct. 15, 2018

(65) Prior Publication Data

US 2019/0115003 A1    Apr. 18, 2019

(30) Foreign Application Priority Data

Oct. 16, 2017   (JP) .............................. JP2017-200120

(51) Int. Cl.

| | |
|---|---|
| *G10K 11/162* | (2006.01) |
| *E04B 1/84* | (2006.01) |
| *G03B 21/16* | (2006.01) |
| *B32B 37/12* | (2006.01) |
| *B32B 5/26* | (2006.01) |
| *G10K 11/16* | (2006.01) |
| *G03B 21/14* | (2006.01) |

(52) U.S. Cl.
CPC .............. *G10K 11/162* (2013.01); *B32B 5/26* (2013.01); *B32B 37/1292* (2013.01); *E04B 1/8409* (2013.01); *G03B 21/16* (2013.01); *G10K 11/161* (2013.01); *B32B 2307/102* (2013.01); *E04B 2001/8438* (2013.01); *G03B 21/145* (2013.01)

(58) Field of Classification Search
CPC ...... G10K 11/161; G10K 11/162; B32B 5/26; B32B 37/1292; B32B 2307/102; G03B 21/16; G03B 21/145; E04B 2001/8438
USPC ......................................... 181/290
See application file for complete search history.

(56) References Cited

U.S. PATENT DOCUMENTS

| | | | |
|---|---|---|---|
| 6,386,317 B1 * | 5/2002 | Morohoshi | F16L 55/033 181/224 |
| 6,533,657 B2 * | 3/2003 | Monson | F24F 13/0263 454/346 |
| 8,057,048 B2 * | 11/2011 | Suzuki | G03B 21/16 353/52 |
| 9,574,791 B2 * | 2/2017 | Lind | F24F 7/065 |

(Continued)

FOREIGN PATENT DOCUMENTS

| | | |
|---|---|---|
| CN | 1947170 B | 12/2010 |
| CN | 101159133 B | 1/2012 |

(Continued)

*Primary Examiner* — Forrest M Phillips
(74) *Attorney, Agent, or Firm* — Oliff PLC

(57) ABSTRACT

A sound absorber includes a side surface section (a first wall section) in which a plurality of first holes are provided, the side surface section including a first surface and a second surface, a thin film stuck to the first surface of the side surface section, a partition wall (a second wall section) opposed to the second surface and provided in a position separated from the second surface, at least one second hole being provided in the partition wall, and a porous material provided to be opposed to the second wall section in a position separated from the partition wall.

15 Claims, 14 Drawing Sheets

(56) References Cited

U.S. PATENT DOCUMENTS

| | | | |
|---|---|---|---|
| 2007/0272482 A1* | 11/2007 | Yamaguchi | G10K 11/172 |
| | | | 181/290 |
| 2008/0053749 A1* | 3/2008 | Utsunomiya | G03B 21/16 |
| | | | 181/286 |
| 2010/0175949 A1 | 7/2010 | Yamaguchi et al. | |
| 2011/0232992 A1 | 9/2011 | Utsunomiya | |

FOREIGN PATENT DOCUMENTS

| | | | | |
|---|---|---|---|---|
| EP | 3379528 A1 * | 9/2018 | | G10K 11/161 |
| JP | H07-210172 A | 8/1995 | | |
| JP | 2010-008997 A | 1/2010 | | |
| JP | 2015-169701 A | 9/2015 | | |

\* cited by examiner

SOUND ABSORBER AND PROJECTOR

BACKGROUND

1. Technical Field

The present invention relates to a sound absorber and a projector.

2. Related Art

There has been known a projector that modulates, according to image information, light emitted from a light source and projects the modulated light. To prevent a temperature rise of the light source and a member that receives the light emitted from the light source, the projector includes a cooling device including a cooling fan or the like. In the projector, noise occurs according to driving of the cooling fan. Therefore, there has been proposed a technique for reducing the noise (see, for example, JP-A-2015-169701 (Patent Literature 1).

The projector (an image forming apparatus) described in Patent Literature 1 includes a silencer configured from three Helmholtz silencers. The Helmholtz silencers are configured from neck sections and resonance box sections. The respective Helmholtz silencers have resonance boxes having sizes different from one another and reduce sound having frequencies different from one another. Space sections are provided among the resonance box sections adjacent to one another not to prevent a sound reducing effect of the resonance box sections.

The noise of the cooling fan includes rotation noise due to cyclic pressure fluctuation involved in rotation of a blade. The rotation noise shows a profile having a volume peak at a specific frequency. More in detail, when a relation between the volume and the frequency of noise is plotted, a plurality of peaks are present at different frequencies. The plurality of peaks are present because, with respect to noise having a certain frequency, sound having a frequency equivalent to a harmonic sound component of the certain frequency is generated. That is, frequencies of the respective plurality of peaks are substantially in an integer times relation with one another. Therefore, to reduce noise of a cooling fan mounted on an electronic apparatus such as a projector, it is necessary to eliminate a plurality of harmonic sound components. That is, silencing has to be performed in a wide frequency band.

Incidentally, in general, in a projector, a cooling fan is disposed in an exterior housing. According to the knowledge obtained by the inventor of this application, in noise involved in driving of the cooling fan, whereas noise in a relatively high frequency band (e.g., a frequency band exceeding 1,000 Hz) is easily absorbed by the exterior housing, noise in a relatively low frequency band (e.g., a frequency band equal to or lower than 1,000 Hz) is less easily absorbed by the exterior housing. Therefore, components in the low-frequency band are considered to occupy most of noise emitted by the entire projector.

In the frequency band equal to or lower than 1,000 Hz, a plurality of harmonic sound components are present as explained above. Therefore, it has been found that, to reduce the noise of the projector, the plurality of harmonic sound components have to be eliminated mainly in a low sound range equal to or lower than 1,000 Hz.

Further, in recent years, heat generation of a light source and the like has markedly increased according to an increase in the luminance of the light source. Therefore, it is necessary to increase the rotating speed and the power of the cooling fan. As a result, noise in the low sound range has greatly increased compared with the existing projector. Therefore, the ability of the existing silencer described in Patent Literature 1 is insufficient for eliminating the noise in the low sound range.

SUMMARY

An advantage of some aspects of the invention is to solve at least a part of the problems described above, and the invention can be implemented as the following forms or application examples.

Application Example 1

A sound absorber according to this application example includes: a first wall section in which a plurality of first holes are provided, the first wall section including a first surface and a second surface; a thin film stuck to the first surface or the second surface of the first wall section; a second wall section opposed to the second surface and provided in a position separated from the second surface, at least one second hole being provided in the second wall section; and a porous material provided to be opposed to the second wall section in a position separated from the second wall section.

With this configuration, the sound absorber includes a first sound absorbing section configured by the first wall section to which the thin film is stuck and a space between the first wall section and the second wall section, a second sound absorbing section configured by the second wall section and a space between the second wall section and the porous material, and a third sound absorbing section configured by the porous material. Consequently, it is possible to absorb a part of a sound wave with vibration of the thin film in the first sound absorbing section. In addition, it is possible to propagate the remaining sound wave mainly from the first holes to the second sound absorbing section and the third sound absorbing section and absorb the sound wave according to the respective sound absorbing section. Therefore, it is possible to provide the sound absorber that reduces noise in a wide frequency band, in particular, a low-frequency band (a frequency band of 500 to 1,000 Hz). This frequency band is a frequency band easily sensed by a human. The reduction of the noise in the low-frequency band achieves a conspicuous effect for a noise reduction in an electronic apparatus such as a projector.

Application Example 2

In the sound absorber according to the application example, it is preferable that the sound absorber has a rectangular parallelepiped shape, the first wall section is a side surface section forming one surface of the rectangular parallelepiped shape, the second wall section is a partition wall provided on an inside of the rectangular parallelepiped shape, and the porous material is disposed on the inside of the rectangular parallelepiped shape.

With this configuration, it is possible to configure the sound absorber including the first, second, and third sound absorbing sections with a simple configuration. Therefore, it is possible to provide the sound absorber that can be easily manufactured.

Application Example 3

In the sound absorber according to the application example, it is preferable that a number of the first holes is larger than a number of the second holes.

Application Example 4

In the sound absorber according to the application example, it is preferable that, when an interval between the first wall section and the second wall section is represented as L1 and an interval between the second wall section and the porous material is represented as L2, the intervals L1 and L2 have a relation of L1<L2.

Application Example 5

In the sound absorber according to the application example, it is preferable that, when length of the porous material in a direction away from the second wall section is represented as L3, the interval L2 and the length L3 have a relation of L2<L3.

Application Example 6

In the sound absorber according to the application example, it is preferable that the porous material is formed of at least of glass wool, urethane, felt, polypropylene, and rock wool.

Application Example 7

In the sound absorber according to the application example, it is preferable that the thin film includes a resin layer and an adhesive layer, and thickness of the resin layer is smaller than thickness of the adhesive layer.

Application Example 8

A projector according to this application example is a projector including a light source, a light modulating device, and a projection lens. The projector includes: a rotating device including a rotating body; and the sound absorber described above.

With this configuration, it is possible to provide the projector including the rotating device (e.g., a motor and a fan). Noise involved in driving of the rotating device can be reduced by the sound absorber. Therefore, it is possible to provide the projector capable of reducing noise.

Application Example 9

In the projector according to the application example, it is preferable that the rotating device is a cooling fan, the projector further includes a channel for guiding air delivered from the cooling fan to a cooling target in the projector, the sound absorber is attached to the channel, and the first wall section of the sound absorber configures a part of a wall section forming the channel.

With this configuration, the sound absorber is configured using a part of the wall section forming the channel in which the air blown from the cooling fan circulates. Consequently, the sound absorber is capable of efficiently reducing not only operation sound of the cooling fan and wind noise of the air blown from the cooling fan.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention are explained below with reference to the drawings. Note that, in the figures referred to below, dimensions and ratios of components are differentiated from actual ones as appropriate to show the components in sizes of degrees recognizable on the drawings.

First Embodiment

A projector 1 and a sound absorber 5 mounted on the projector 1 according to a first embodiment are explained with reference to the drawings.

Figure 1:
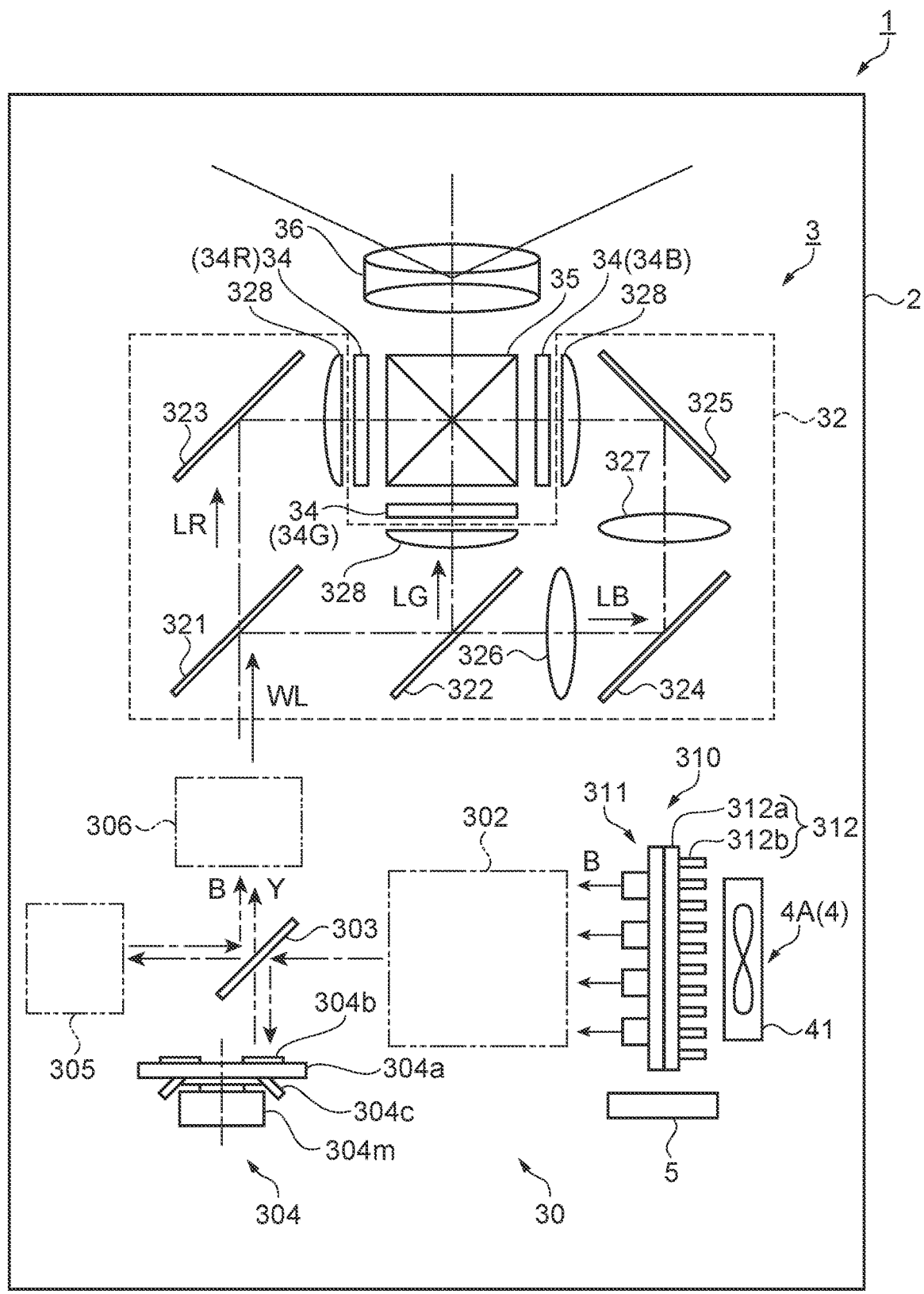
FIG. 1 is a schematic diagram showing a schematic configuration of a projector in a first embodiment.
Figure 2:
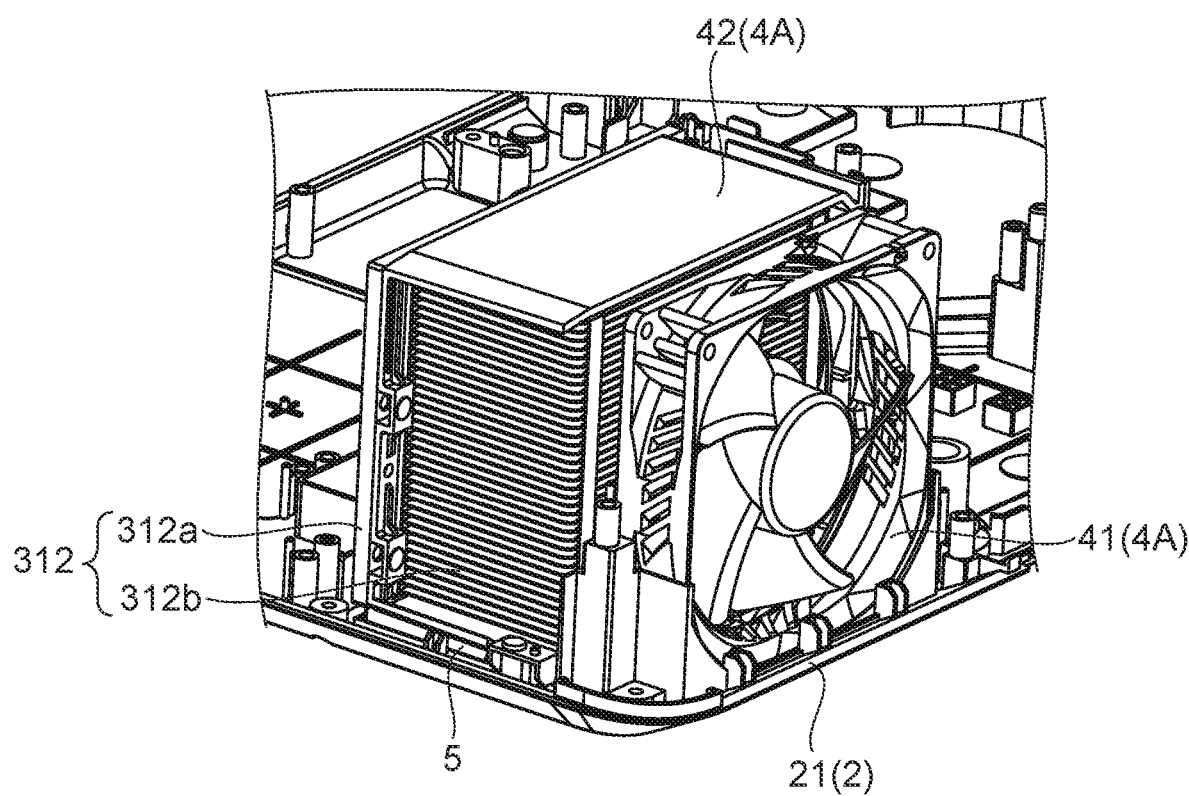
FIG. 2 is a perspective view showing a part of the inside of the projector in the first embodiment.
Figure 3:
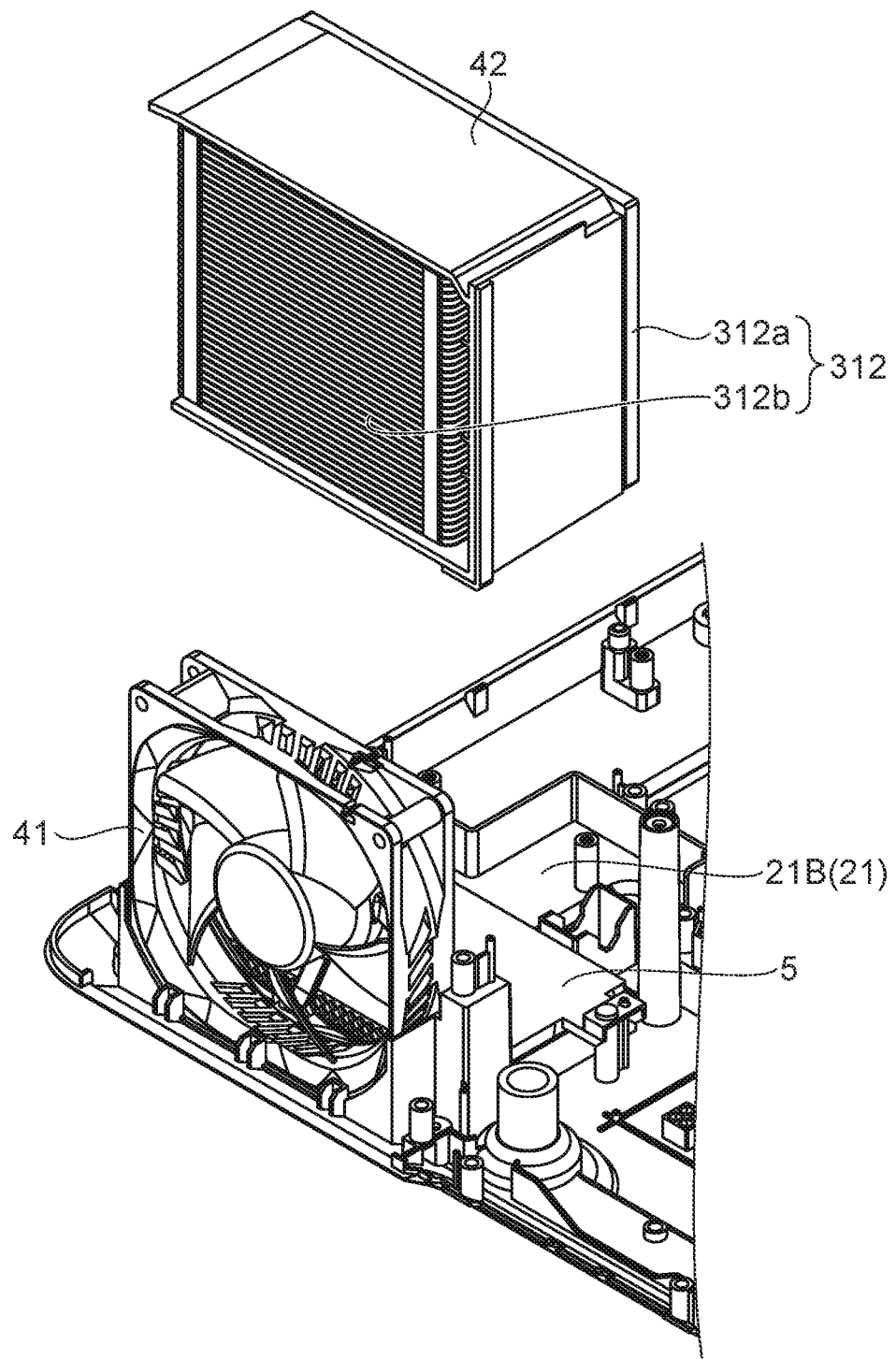
FIG. 3 is an exploded perspective view showing a part of the inside of the projector viewed from a direction different from a direction in FIG. 2.

FIG. 1 is a schematic diagram showing a schematic configuration of the projector 1 in this embodiment. FIG. 2 is a perspective view showing a part of the inside of the projector 1 and is a view showing the vicinities of the sound absorber 5 and a heat sink 312 explained below. FIG. 3 is a diagram showing a part of the inside of the projector 1 viewed from a direction different from a direction in FIG. 2 and is an exploded perspective view in which the heat sink 312 and a duct member 42 explained blow are exploded.

The projector 1 includes, as shown in FIGS. 1 to 3, an exterior housing 2, a control section (not shown in FIGS. 1 to 3), an optical unit 3, a cooling device 4, and the sound absorber 5. The projector 1 projects an image onto a projection surface such as a screen. Although not shown in FIGS. 1 to 3, the projector 1 includes a power supply device that supplies electric power to electronic components on the inside. In the following explanation, for convenience of explanation, in a posture in which the projector 1 is placed on a desk or the like, the upper side of the projector 1 is described as an upward direction and a direction in which the projector 1 projects an image is described as a forward direction.

Although detailed explanation is omitted, the exterior housing 2 is configured by a member such as an upper case (not shown in FIGS. 2 and 3) in addition to a lower case 21 (see FIGS. 2 and 3). The lower case 21 includes a bottom surface section 21B (see FIG. 3) opposed to the desk surface in a posture in which the projector 1 is placed on the desk or the like. The not-shown upper case is fit in the lower case to form the side surfaces and the upper surface of the exterior housing 2. In the upper case, an intake port for introducing the outside air and an exhaust port for discharging heated air on the inside are formed (both of the intake port and the exhaust port are not shown in FIGS. 2 and 3).

The control section includes a CPU (Central Processing Unit), a ROM (Read Only Memory), a RAM (Random Access Memory) and the like, and functions as a computer. The control section performs control of the operation of the projector 1, for example, control concerning projection of an image.

The optical unit 3 includes, as shown in FIG. 1, an illuminating device 30, a color-separation light-guide optical system 32, light modulating devices 34, a cross dichroic prism 35, and a projection lens 36.

The illuminating device 30 includes a light source device 310, a first optical system 302, a polarization separation element 303, a wavelength converting device 304, a second optical system 305, and a third optical system 306.

The light source device 310 includes a light source 311 including a plurality of semiconductor lasers and the heat sink 312 configured to radiate heat of the light source 311. The light source 311 emits blue light (B).

The heat sink 312 includes, as shown in FIGS. 2 and 3, a base section 312a to which the heat of the light source 311 is conducted and a plurality of fins 312b projecting from the base section 312a.

In the heat sink 312, as shown in FIG. 3, the base section 312a extends in a direction orthogonal to the inner surface of the bottom surface section 21B of the lower case 21 and the plurality of fins 312b extend in a direction along the inner surface of the bottom surface section 21B. A not-shown exhaust port in the exterior housing 2 is provided in the direction in which the fins 312b near the heat sink 312 extend.

Although detailed explanation is omitted, the first optical system 302 includes optical components such as a collimator optical system, an afocal optical system, a phase difference plate, and a homogenizer optical system. The first optical system 302 converts the blue light emitted from the light source device 310 to be effectively used in the wavelength converting device 304 and the second optical system 305.

The polarization separation element 303 reflects blue light of an S-polarized component and transmits blue light of a P-polarized component in light emitted from the first optical system 302. The polarization separation element 303 transmits fluorescent light explained below having a wavelength band different from a wavelength band of the blue light irrespective of a polarization state of the fluorescent light.

The wavelength converting device 304 includes, as shown in FIG. 1, a wavelength conversion element 304a, a heat radiation member 304c, and a motor 304m.

The wavelength conversion element 304a includes a base material formed in a disk shape and a phosphor layer 304b provided in a ring shape on the base material.

The wavelength conversion element 304a is excited by the blue light reflected on the polarization separation element 303 to emit fluorescent light (yellow light (Y)) and reflects the yellow light toward the polarization separation element 303.

The heat radiation member 304c includes a part connected to a side of the base material in the wavelength conversion element 304a opposite to the phosphor layer 304b and a plurality of blade sections projecting from the part.

The motor 304m is equivalent to a rotating device including a rotor (a rotating body). The motor 304m rotates the wavelength conversion element 304a and the heat radiation member 304c.

The wavelength conversion element 304a is rotated by the motor 304m, whereby local heat generation due to movement of an irradiation position of the blue light on the phosphor layer 304b is prevented. Heat is radiated by the rotation of the heat radiation member 304c.

The second optical system 305 includes a phase difference plate and a reflection element. The second optical system 305 changes a polarization state of the blue light transmitted through the polarization separation element 303 and emits the blue light toward the polarization separation element 303.

The polarization separation element 303 transmits the yellow light (Y) emitted from the wavelength conversion element 304a and reflects the blue light (B) emitted from the second optical system 305. That is, the polarization separation element 303 emits white light (WL) obtained by combining the yellow light (Y) and the blue light (B).

Although detailed explanation is omitted, the third optical system 306 includes optical components such as a uniform optical system and a polarization conversion element. The third optical system 306 substantially uniformizes light emitted from the polarization separation element 303 and aligns a polarization state of the light such that the light is effectively used in the light modulating devices 34.

The color-separation light-guide optical system 32 includes dichroic mirrors 321 and 322, reflection mirrors 323, 324, and 325, relay lenses 326 and 327, and a field lens 328. The color-separation light-guide optical system 32 separates the white light WL emitted from the third optical system 306 into red light LR, green light LG, and blue light LB and guides the color lights to the light modulating devices 34 for the color lights.

The light modulating devices 34 are provided for the color lights. The light modulating device for the red light LR is represented as 34R, the light modulating device for the green light LG is represented as 34G, and the light modulating device for the blue light LB is represented as 34B. Although detailed illustration is omitted, the light modulating devices include liquid crystal panels of a transmission type, holding sections configured to hold the liquid crystal panels, incident-side polarization plates disposed on light incident sides of the liquid crystal panels, and emission-side polarization plates disposed on light emission sides of the liquid crystal panels. The light modulating devices 34 modulate the incident color lights according to image information.

The cross dichroic prism 35 combines the color lights modulated by the light modulating devices 34 and forms image light. The projection lens 36 enlarges and projects the image light formed by the cross dichroic prism 35.

The cooling device 4 includes a first cooling device 4A configured to cool the light source device 310 and includes, although not illustrated in this embodiment, a second cooling device configured to cool optical components such as the light modulating devices 34.

The first cooling device 4A includes, as shown in FIGS. 2 and 3, a cooling fan 41 and the duct member 42 disposed near the heat sink 312.

The cooling fan 41 is configured by an axial fan having a rectangular shape in plan view. The cooling fan 41 is disposed on a side of the fins 312b opposite to the base section 312a. The cooling fan 41 is equivalent to the rotating device including the rotating blade (the rotating body).

An intake port (not shown in FIGS. 2 and 3) of the exterior housing 2 is provided on a side of the cooling fan 41 opposite to the heat sink 312. The cooling fan 41 introduces the outside air from the intake port and blows the air to the fins 312b. Note that an air intake side of the cooling fan 41 (an intake port side of the exterior housing 2) is the front side of the projector 1.

As shown in FIGS. 2 and 3, the duct member 42 is formed to cover the upper side of the fins 312b and a side of the fins 312b opposite to the exhaust port. The air blown from the cooling fan 41 to the fins 312b traces the fins 312b and is guided by the duct member 42 to be discharged to the outside from the exhaust port of the exterior housing 2. In the light source 311, heat radiation of the heat sink 312 is promoted by the air blown from the cooling fan 41. A temperature rise of the light source 311 is prevented.

The projector 1 in this embodiment is configured to enable a normal mode in which an output of the light source 311 is set in a normal state and a low luminance mode in which the output of the light source 311 is set lower than the output in the normal mode. The cooling fan 41 is set to have different rotating speeds in the normal mode and the low luminance mode. For example, the cooling fan 41 is set to rotate at approximately 2,200 rpm in the normal mode and rotate at approximately 1,250 rpm in the low luminance mode.

As shown in FIGS. 2 and 3, the sound absorber 5 is disposed below the heat sink 312 near the cooling fan 41. The sound absorber 5 reduces noise such as operation sound and wind noise involved in the driving of the cooling fan 41.

Configuration of the Sound Absorber

The sound absorber 5 is explained in detail.

Figure 4:
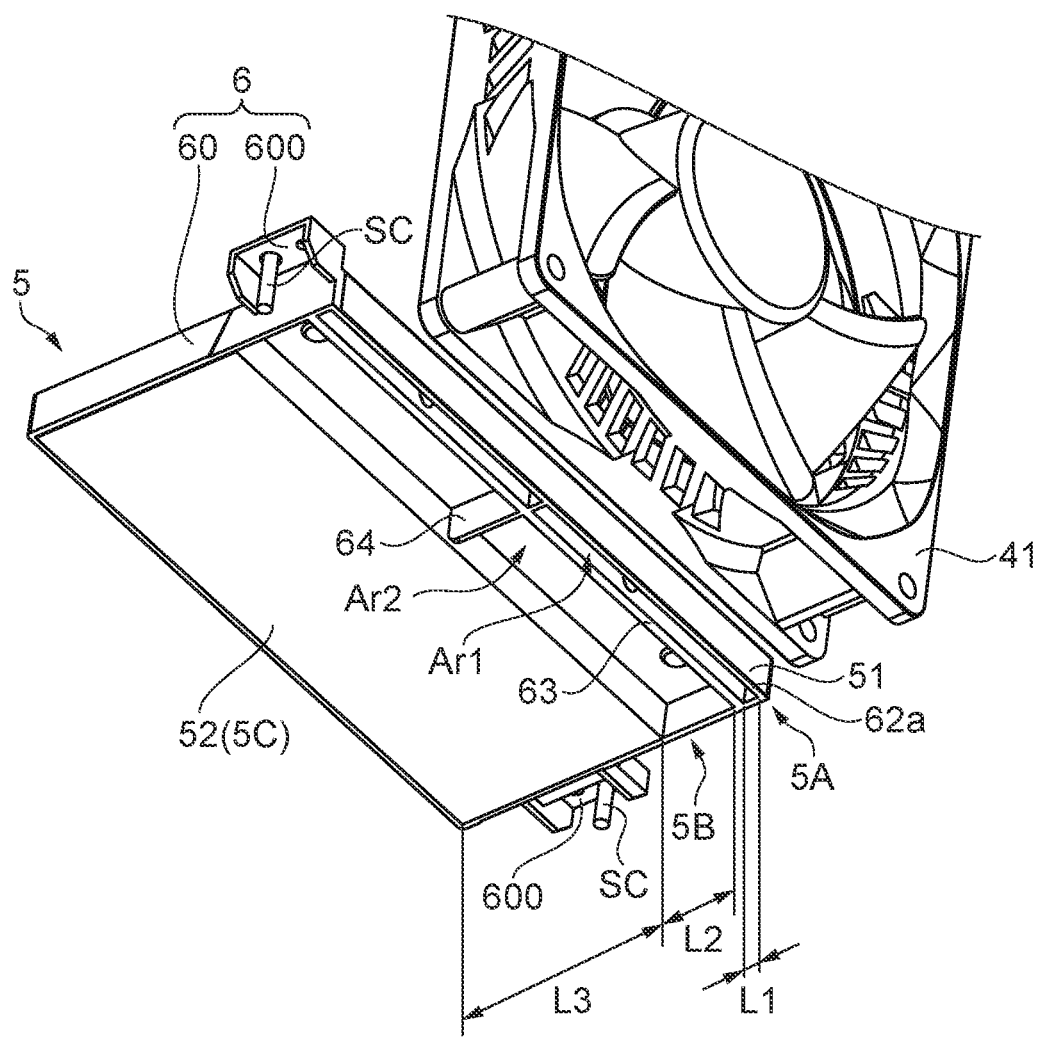
FIG. 4 is a perspective view showing a part of the inside of a sound absorber and a cooling fan viewed from a lower case side in the first embodiment.
Figure 5:
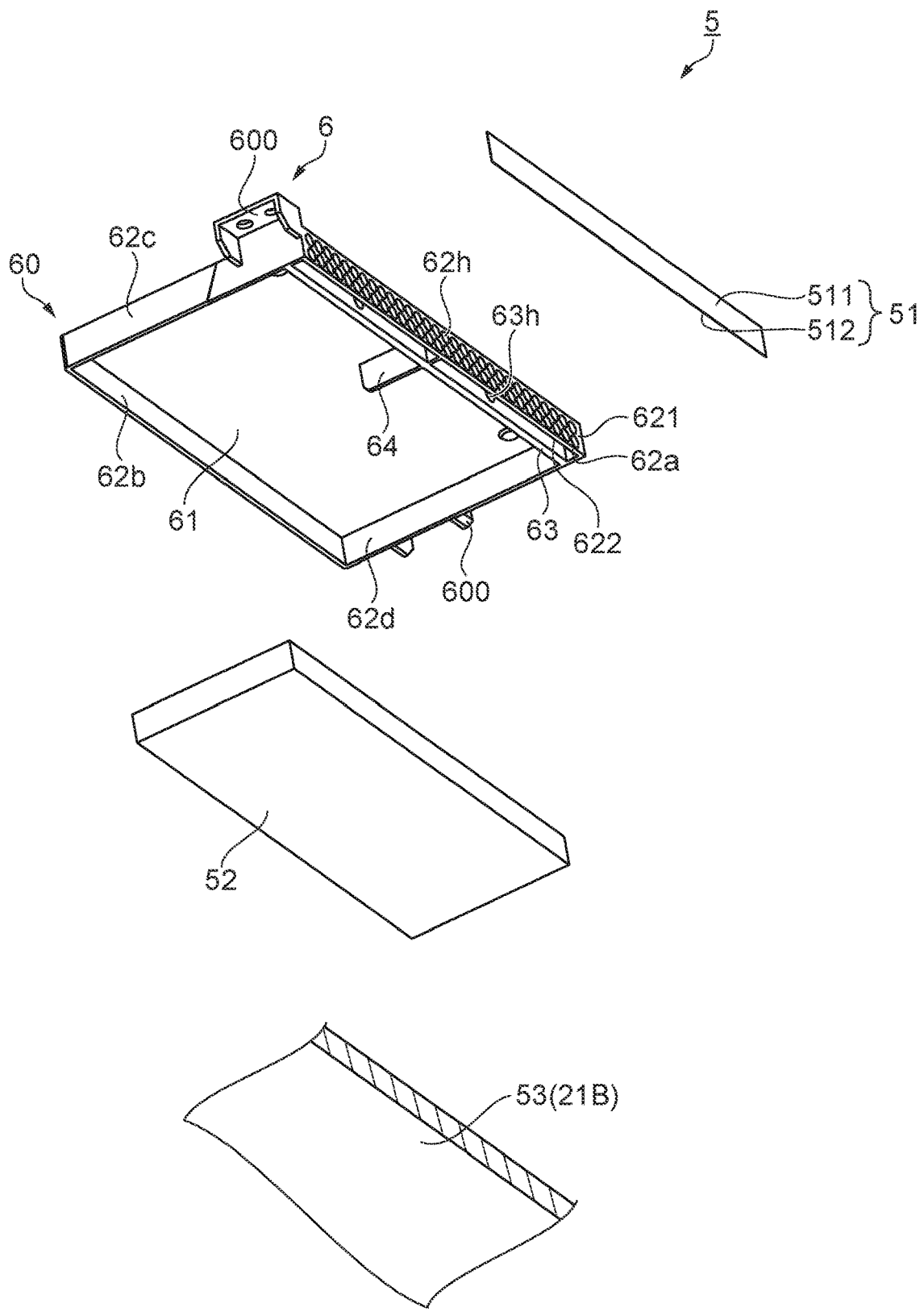
FIG. 5 is an exploded perspective view of the sound absorber in the first embodiment.

FIG. 4 is a perspective view showing a part of the inside of the sound absorber 5 and the cooling fan 41 viewed from the lower case 21 side. FIG. 5 is an exploded perspective view of the sound absorber 5.

As shown in FIG. 4, the sound absorber 5 is disposed on a deliver port side of the air in the cooling fan 41 and near the end portion on the lower case 21 (see FIG. 3) side of the cooling fan 41. As shown in FIGS. 4 and 5, the sound absorber 5 is configured by a frame 6, a thin film 51, a porous material 52, and a part of the bottom surface section 21B in the lower case 21. The part of the bottom surface section 21B is a lid section 53.

The frame 6 includes a main body section 60 formed in a rectangular parallelepiped shape and a pair of attaching sections 600 respectively projecting from both sides of the main body section 60.

A side of the main body section 60 opposite to the heat sink 312 is opened. The main body section 60 includes a tabular section 61 having a rectangular shape in plan view opposed to the heat sink 312 and four side surface sections 62a, 62b, 62c, and 62d erected to the opposite side of the heat sink 312 respectively from four sides of the tabular section 61.

As shown in FIG. 4, the side surface section 62a is located near the cooling fan 41 and formed in a long shape. The length in the longitudinal direction (the width direction) of the side surface section 62a is formed the same as the length of one side of the cooling fan 41. A plurality of first holes 62h are provided in the side surface section 62a. The side surface section 62a is formed in a size of, for example, plate thickness of approximately 1 mm to several millimeters, width of approximately 120 mm, and height of approximately 10 mm. The sides surface section 62a is equivalent to a first wall section.

As shown in FIG. 5, the side surface section 62a includes a first surface 621 on the outer side in the main body section 60 and a second surface 622 on the inner side in the main body section 60.

The side surface section 62b is provided on a side of the tabular section 61 opposite to the side surface section 62a. The side surface section 62c and the side surface section 62d are opposed to each other. The side surface section 62c connects one end portion of the side surface section 62a and one end portion of the side surface section 62b. The side surface section 62d connects the other end portion of the side surface section 62a and the other end portion of the side surface section 62b.

In the main body section 60, a partition wall 63 and a rib 64 projecting to the same side as the side surface sections 62a, 62b, 62c, and 62d from the tabular section 61 are provided.

The partition wall 63 is opposed to the second surface 622 of the side surface section 62a (the first wall section) and is provided at an interval L1 from the side surface section 62a. The partition wall 63 is formed to have thickness of approximately several millimeters and is connected to the side surface sections 62c and 62d. A plurality of second holes 63h are formed in the partition wall 63. The partition wall 63 is equivalent to a second wall section.

The rib 64 extends from the partition wall 63 to the side surface section 62b side between the side surface section 62c and the side surface section 62d. The rib 64 has a predetermined length from the partition wall 63. The rib 64 is separated from the side surface section 62b by a predetermined distance.

The pair of attaching sections 600 respectively projects from the side surface section 62c and the side surface section 62d. Insert-through holes, through which screws SC (see FIG. 4) are inserted, are formed in the pair of attaching sections 600. Note that bosses corresponding to the pair of attaching sections 600 are provided in the lower case 21.

The thin film 51 includes, as shown in FIG. 5, a resin layer 511 and an adhesive layer 512. The thin film 51 is stuck to the first surface 621 (a surface on the opposite side of the partition wall 63) of the side surface section 62a. As the resin layer 511, for example, a polyimide film having thickness of 0.012 mm can be used. As the adhesive layer 512, for example, a silicone tacky material having thickness of 0.023 mm can be used. Note that the resin layer 511 is not limited to the polyimide material and may be another material (e.g., polyethylene terephthalate or polypropylene). The thickness of the resin layer 511 is not limited to the thickness described above and may be, for example, thickness equal to or smaller than 0.1 mm. The thickness of the resin layer 511 is desirably thickness equal to or smaller than 0.05 mm. The adhesive layer 512 is not limited to the silicone material and may be another material. The thickness of the resin layer 511 is desirably smaller than the thickness of the adhesive layer 512.

The porous material 52 is formed in a rectangular parallelepiped shape and is disposed between the side surface section 62c and the side surface section 62d in the main body section 60 and between the side surface section 62b and the rib 64. That is, the porous material 52 is disposed to be opposed to the partition wall 63 in a position separated from the partition wall 63 (the second wall section). More specifically, the porous material 52 is disposed to be opposed to the partition wall 63 on a side of the partition wall 63 opposite to the side surface section 62a.

The porous material 52 is disposed at an interval L2 from the partition wall 63. The porous material 52 has length L3 in a direction away from the partition wall 63. As the porous material 52, for example, a foam material made of polyurethane can be used. The porous material 52 is desirably formed from at least one of glass wool, urethane, felt, polypropylene, and rock wool.

The frame 6 to which the thin film 51 is stuck and in which the porous material 52 is disposed in the main body section 60 is fixed to the lower case 21 by inserting the screws SC through the pair of attaching sections 600. As a result, the opening section of the main body section 60 is closed by the lid section 53 (the lower case 21) and the sound absorber 5 is assembled.

In the sound absorber 5, as shown in FIG. 4, a first space Ar1 is provided between the side surface section 62a (the first wall section) and the partition wall 63 (the second wall section) and a second space Ar2 is provided between the partition wall 63 (the second wall section) and the porous material 52.

In this way, the sound absorber 5 includes the main body section 60 formed in a rectangular parallelepiped shape. The side surface section 62a forms one surface of the main body section 60. The sound absorber 5 is disposed to set the height direction of the side surface section 62a as the up-down direction of the projector 1. That is, the sound absorber 5 is formed thin to prevent the projector 1 from being increased in size. The sound absorber 5 is disposed near a source of noise (the cooling fan 41).

The sound absorber 5 includes a first sound absorbing section 5A configured by the side surface section 62a (the first wall section) to which the thin film 51 is stuck and the first space Ar1, a second sound absorbing section 5B configured by the partition wall 63 (the second wall section) and the second space Ar2, and a third sound absorbing section 5C configured by the porous material 52. In the sound absorber 5, as shown in FIG. 4, the first sound absorbing section 5A, the second sound absorbing section 5B, and the third sound absorbing section 5C are disposed in this order in a direction away from the cooling fan 41.

The first sound absorbing unit 5A absorbs a part of a sound wave with vibration of the thin film 51 and, in addition, propagates the remaining sound wave mainly from the first holes 62h to the second sound absorbing section 5B. The first holes 62h are, for example, round holes having an inner diameter of 3 mm. Approximately sixty first holes 62h are provided in the side surface section 62a. The first sound absorbing section 5A is configured with the interval L1 set to, for example, approximately 3 mm. Note that the first holes 62h are not limited to the round holes and may be square holes having a rectangular shape in plan view or a polygonal shape. The round holes and the square holes may be mixed in the first holes 62h.

Parts of the thin film 51 overlapping the openings of the first holes 62h vibrate with a sound wave to absorb a part of energy of the sound wave. As explained above, in the thin film 51, the thickness of the resin layer 511 is desirably smaller than the thickness of the adhesive layer 512. With this configuration, the adhesive layer 512 improves elasticity of the thin film 51. Therefore, a sound wave in a low-frequency band is considered to be more effectively absorbed.

The second sound absorbing section 5B has a configuration equivalent to a Helmholtz resonator. The second holes 63h provided in the partition wall 63 are, for example, round holes having an inner diameter of approximately 4.5 mm. Two second holes 63h are provided in the partition wall 63. At least one second hole 63h only has to be provided. That is, the number of the first holes 62h provided in the side surface section 62a is set larger than the number of the second holes 63h provided in the partition wall 63. The second sound absorbing section 5B is configured with the interval L2 (see FIG. 4) set to, for example, approximately 15 mm. That is, the sound absorber 5 is configured such that a relation between the interval L1 and the interval L2 is L1<L2. Note that the second holes 63h are not limited to the round holes and may be square holes having a rectangular shape in plan view or a polygonal shape. The round holes and the square holes may be mixed in the second holes 63h.

The third sound absorbing section 5C configured by the porous material 52 includes thin holes and a fiber-like member. The third sound absorbing section 5C is formed with the length L3 set to, for example, approximately 36 mm. That is, the sound absorber 5 is configured such that a relation between the interval L2 and the length L3 is L2<L3. The porous material 52 absorbs a part of energy of a sound wave with friction, viscous resistance, vibration, and the like due to the thin holes and the fiber-like member.

In this way, the sound absorber 5 includes the three sound absorbing sections, that is, the first sound absorbing section 5A, the second sound absorbing section 5B, and the third sound absorbing section 5C. The sound absorbers reduces noise involved in the driving of the cooling fan 41.

A sound absorption characteristic of the sound absorber 5 is explained.

First, noise caused when the cooling fan 41 is driven in the projector 1 not attached with the sound absorber 5 is explained. Note that, in the following explanation, for convenience of explanation, the projector 1 not attached with the sound absorber 5 is referred to as a projector 1Na.

Figure 6:
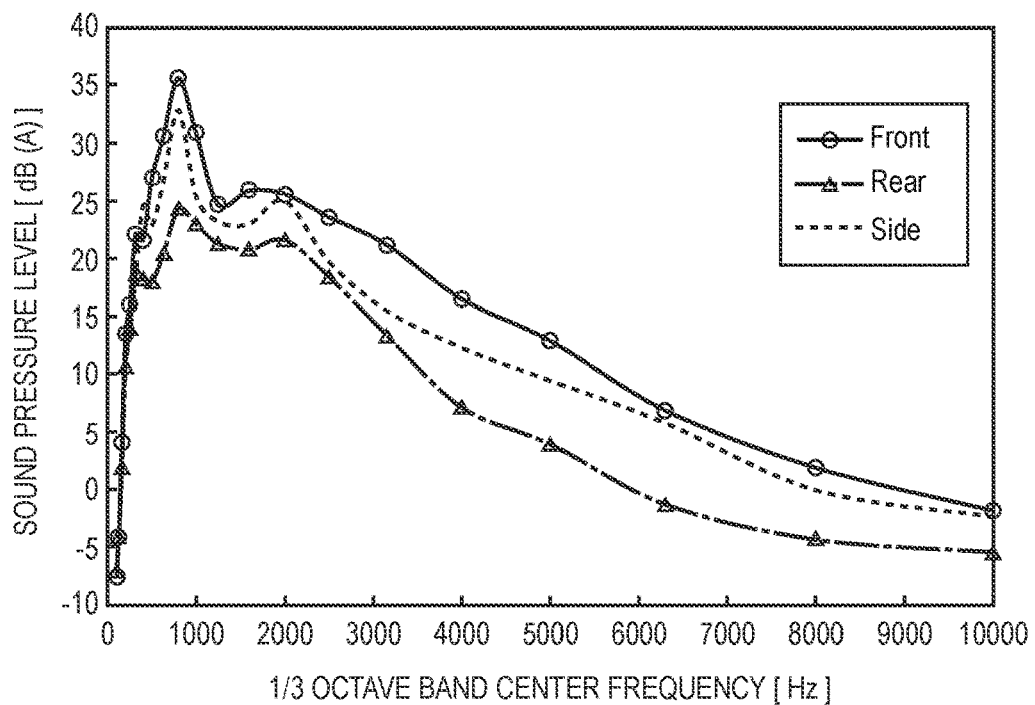
FIG. 6 is a graph showing a result of measuring noise of the projector not attached with the sound absorber when the cooling fan is driven.

FIG. 6 is a graph showing a result obtained by measuring noise of the projector 1Na when the cooling fan 41 is driven and is a graph showing a sound pressure level (noise) of the projector 1Na with respect to a ⅓ octave band center frequency. FIG. 6 is a graph showing a result obtained when the cooling fan 41 is driven in the normal mode (rotating speed is approximately 2,200 rpm) and is a graph showing a result of measurement from the front, the rear, and the side of the projector 1Na.

Noise of the cooling fan 41 alone includes rotation noise and the like involved in rotation of a blade. In terms of a frequency, the noise shows a characteristic in which magnitude has a projecting peak. The peak occurs at integer times in terms of a frequency. The frequency of the peak of the noise in the cooling fan 41 in this embodiment showed, for example, a value between approximately 700 to 800 Hz in the normal mode (rotating speed is approximately 2,200 rpm).

As shown in FIG. 6, in all of the front, the rear, and the side, noise of the projector 1Na involved in the driving of the cooling fan is small in a high-frequency band exceeding 1,000 Hz and is large in a low-frequency band equal to or lower than approximately 1,000 Hz. This is considered to be because, in the exterior housing 2 that houses the cooling fan 41, absorption of a sound wave in a high-frequency band is large and absorption of a sound wave in a low-frequency band is small. Specifically, as shown in FIG. 6, the noise of the projector 1Na is large in a frequency band (a low-frequency band) of approximately 500 Hz to approximately 1,000 Hz and is the largest at approximately 800 Hz.

Figure 7:
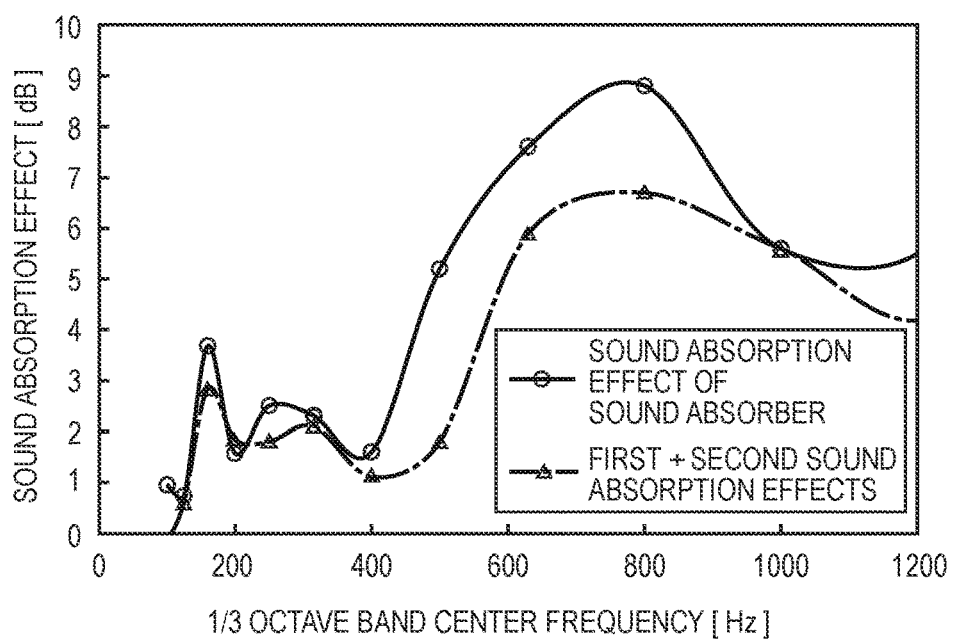
FIG. 7 is a graph showing a sound absorption characteristic of the sound absorber in the first embodiment.

FIG. 7 is a graph showing a sound absorption characteristic of the sound absorber 5 in this embodiment. Specifically, FIG. 7 is a graph showing, when a case for experiment (not shown in FIG. 7) is used, a sound absorption effect (in FIG. 7, indicated by "sound absorption effect of sound absorber") in a state in which the sound absorber 5 is disposed in the case with respect to a sound pressure level in a state in which the sound absorber 5 is not disposed in the case. For examination, FIG. 7 shows a sound absorption effect (in FIG. 7, indicated by "first+second sound absorption effects) in a state in which the first sound absorbing section 5A and the second sound absorbing section 5B, which are a part of the sound absorber 5, are disposed in the case for experiment. Note that, in the experiment, pink noise is used as a sound source.

As shown in FIG. 7, even the part of the sound absorber 5 (the first sound absorbing section 5A and the second sound absorbing section 5B) has a large sound absorption effect in a low-frequency band (the frequency band of approximately 500 Hz to approximately 1,000 Hz). In the sound absorber 5 further including the third sound absorbing section 5C in addition to the first sound absorbing section 5A and the second sound absorbing section 5B, a sound absorption effect in the low-frequency band is larger. In this way, the sound absorber 5 is configured to reduce the noise in the low-frequency band.

Figure 8:
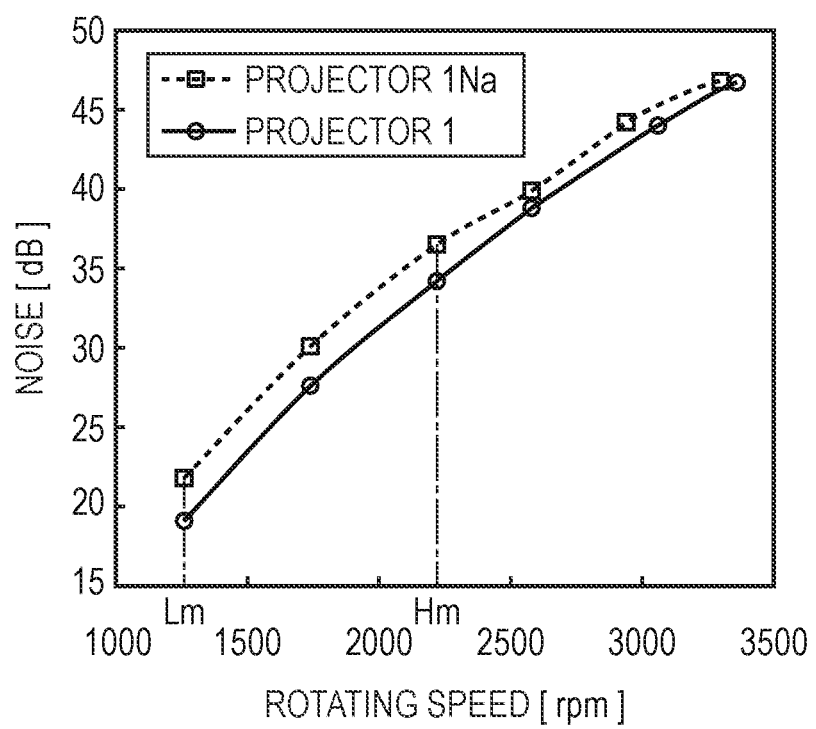
FIG. 8 is a graph showing a relation between rotating speed of the cooling fan and noise of each of the projector not attached with the sound absorber and the projector attached with the sound absorber.

FIG. 8 is a graph showing a relation between rotating speed of the cooling fan 41 and noise of the projector 1Na and noise of the projector 1.

As shown in FIG. 8, noise involved in the driving of the cooling fan 41 increases as the rotating speed increases. The noise of the projector 1 mounted with the sound absorber 5 is smaller than the noise of the projector 1Na not mounted with the sound absorber 5. Specifically, the noise of the projector 1 is lower than the noise of the projector 1Na by approximately 2.4 dB at rotating speed (in FIG. 8, indicated by "Hm") in the normal mode and is lower than the noise of the projector 1Na by approximately 2.8 dB at rotating speed (in FIG. 8, indicated by "Lm") in the low luminance mode.

In this way, the sound absorber 5 includes the first sound absorbing section 5A, the second sound absorbing section 5B, and the third sound absorbing section 5C and is configured to reduce noise in a low-frequency band.

As explained above, according to this embodiment, effects described below can be obtained.

(1) The projector 1 includes the sound absorber 5. Therefore, noise involved in the driving of the cooling fan 41, in particular, noise in the low-frequency band (the frequency band of approximately 500 Hz to approximately 1,000 Hz) is reduced. This low-frequency band is a frequency band that a human easily senses. The noise of the projector 1 is more effectively reduced.

(2) The sound absorber 5 has simple structure in which the thin film 51 is stuck to the main body section 60 of the frame 6 and the porous material 52 is disposed on the inside of the main body section 60. Therefore, the sound absorber 5 can be easily manufactured.

The sound absorber 5 is configured using a part of the lower case 21. Therefore, an increase in the number of components is prevented. The sound absorber 5 can be more easily manufactured.

(3) The sound absorber 5 can be reduced in thickness. Therefore, it is possible to provide the projector 1 capable of reducing noise while preventing an increase in the size of the projector 1.

Second Embodiment

A projector 10 and a sound absorber 15 according to a second embodiment are explained. In the following explanation, the same components as the components in the first embodiment are denoted by the same reference numerals and signs and detailed explanation of the components is omitted or simplified.

Figure 9:
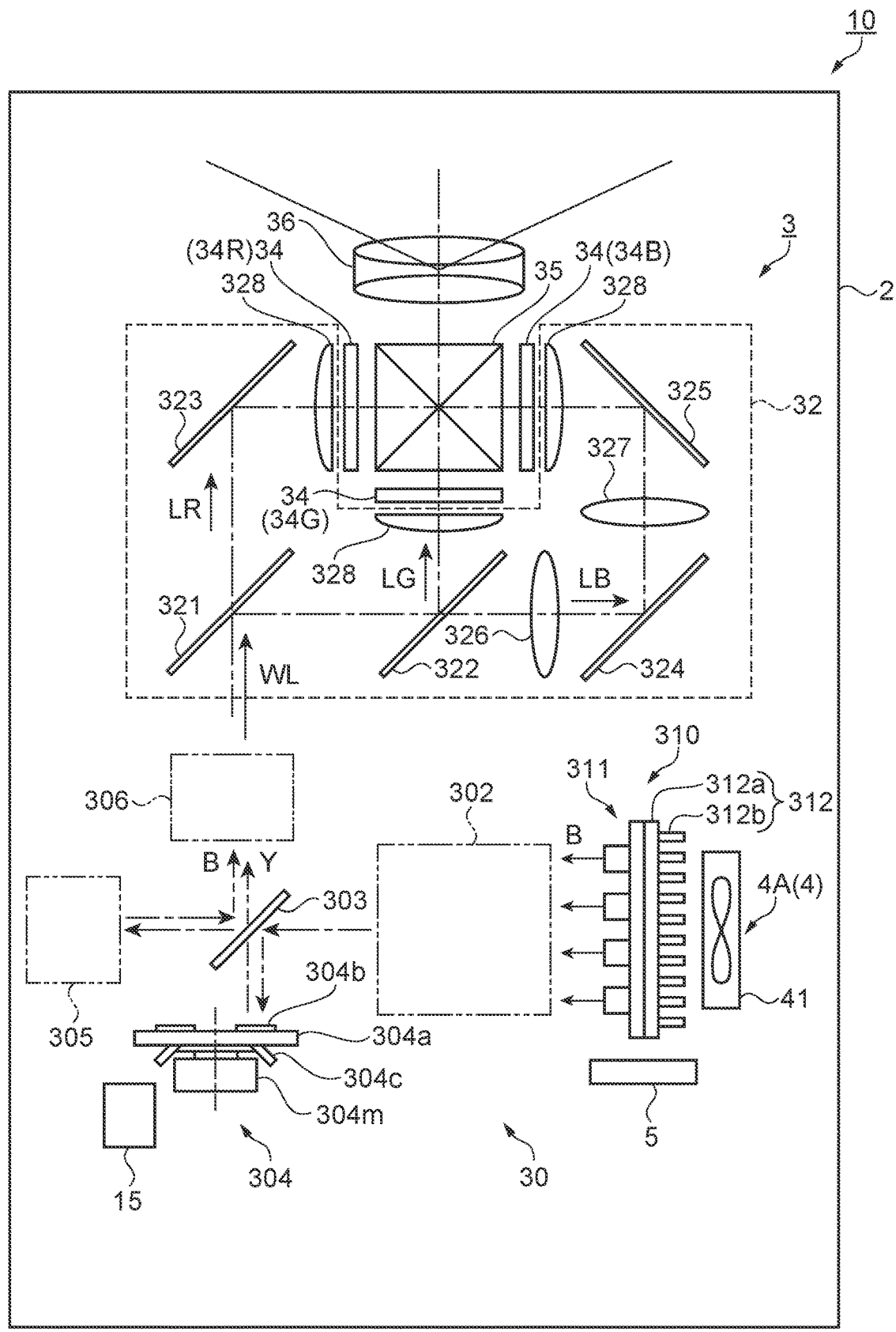
FIG. 9 is a schematic diagram showing a schematic configuration of a projector in a second embodiment.

FIG. 9 is a schematic diagram showing a schematic configuration of the projector 10 according to this embodiment.

As shown in FIG. 9, the projector 10 includes the sound absorber 15 disposed near the wavelength converting device 304.

Although detailed illustration is omitted, the sound absorber 15 has the same configuration as the configuration of the sound absorber 5 explained in the first embodiment. That is, the sound absorber 15 includes a first sound absorbing section configured by a first wall section to which a thin film is stuck and a first space, a second sound absorbing section configured by a second wall section and a second space, and a third sound absorbing section configured by a porous material.

The sound absorber 15 is formed in a shape different from the shape of the sound absorber 5 in the first embodiment according to a space near the wavelength converting device 304.

The sound absorber 15 reduces noise such as operation sound of the motor 304m and wind noise of the heat radiation member 304c involved in driving of the motor 304m in the wavelength converting device 304.

As explained above, according to this embodiment, the projector 10 includes the sound absorber 15 disposed near the wavelength converting device 304. Therefore, noise involved in the driving of the motor 304m is reduced. Therefore, it is possible to provide the projector 10 capable of reducing noise while preventing deterioration of the wavelength conversion element 304a, that is, while preventing a decrease in brightness, color unevenness, and the like of a projected image.

Third Embodiment

A projector and a sound absorber according to a third embodiment are explained with reference to the drawings. In the following explanation, the same components as the components in the first embodiment are denoted by the same reference numerals and signs and detailed explanation of the components is omitted or simplified.

In the projector in this embodiment, the sound absorber is provided in a second cooling device that cools the light modulating devices 34 and the like.

Figure 10:
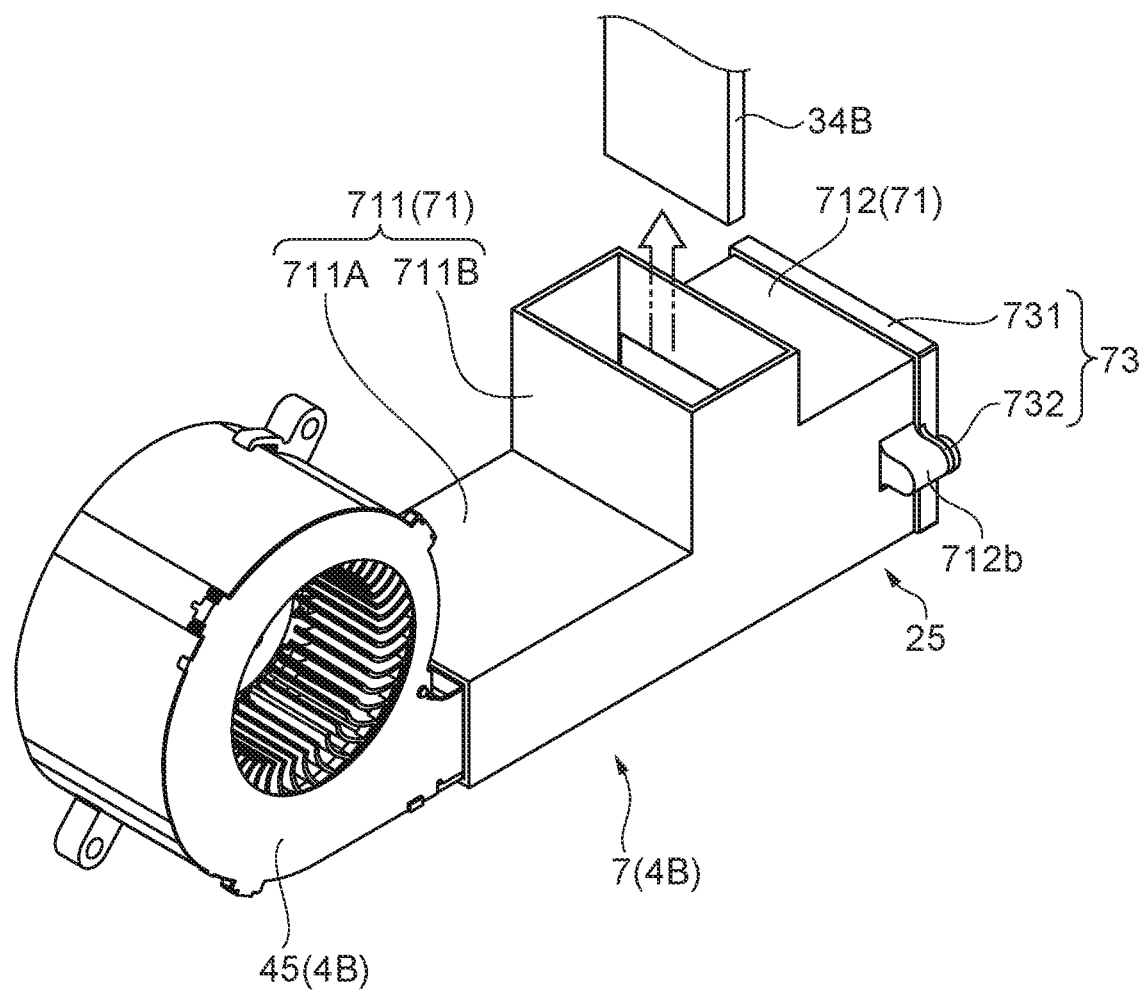
FIG. 10 is a perspective view schematically showing a part of a second cooling device and an optical component set as a cooling target in a third embodiment.

FIG. 10 is a perspective view schematically showing a part of a second cooling device 4B and an optical component (e.g., the light modulating device 34B for blue light) set as a cooling target in this embodiment. Note that the cooling target is not limited to the light modulating device 34B and may be the light modulating devices 34R and 34G or may be other optical components, for example, a polarization conversion element (not shown in FIG. 10) and the like in the third optical system 306 (see FIG. 1).

The second cooling device 4B includes, as shown in FIG. 10, a cooling fan 45 and a duct unit 7.

Figure 11:
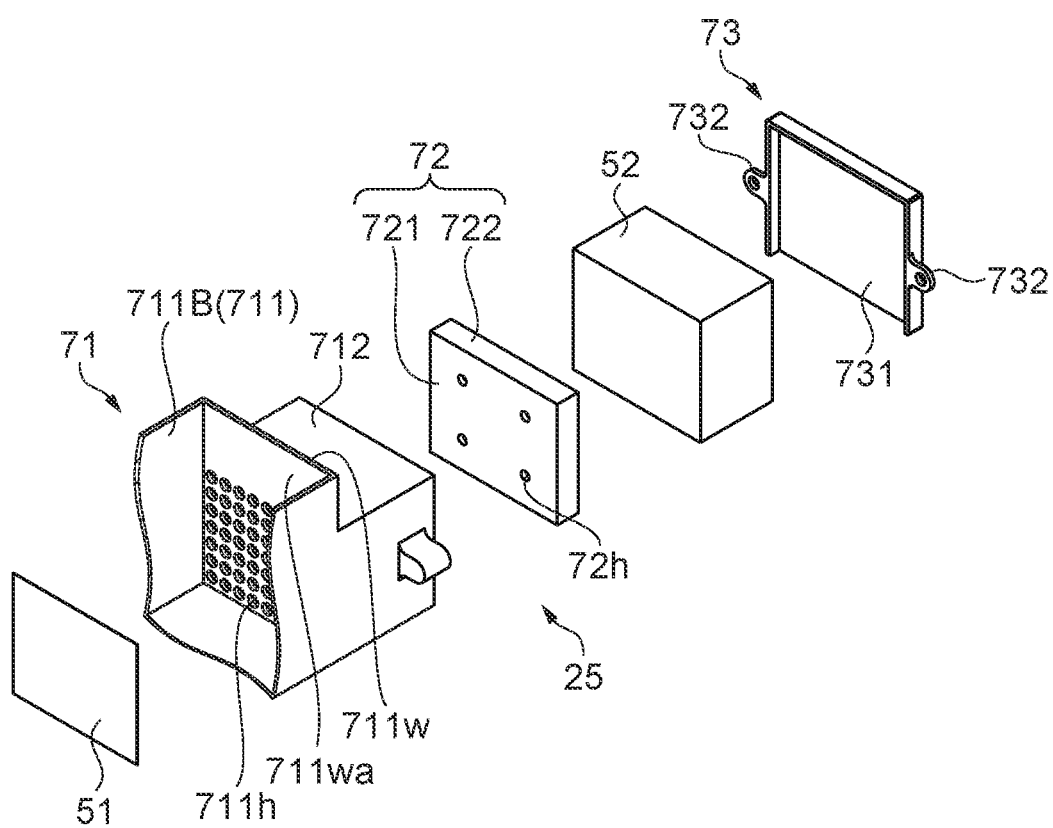
FIG. 11 is an exploded perspective view of a duct unit in a third embodiment.
Figure 12:
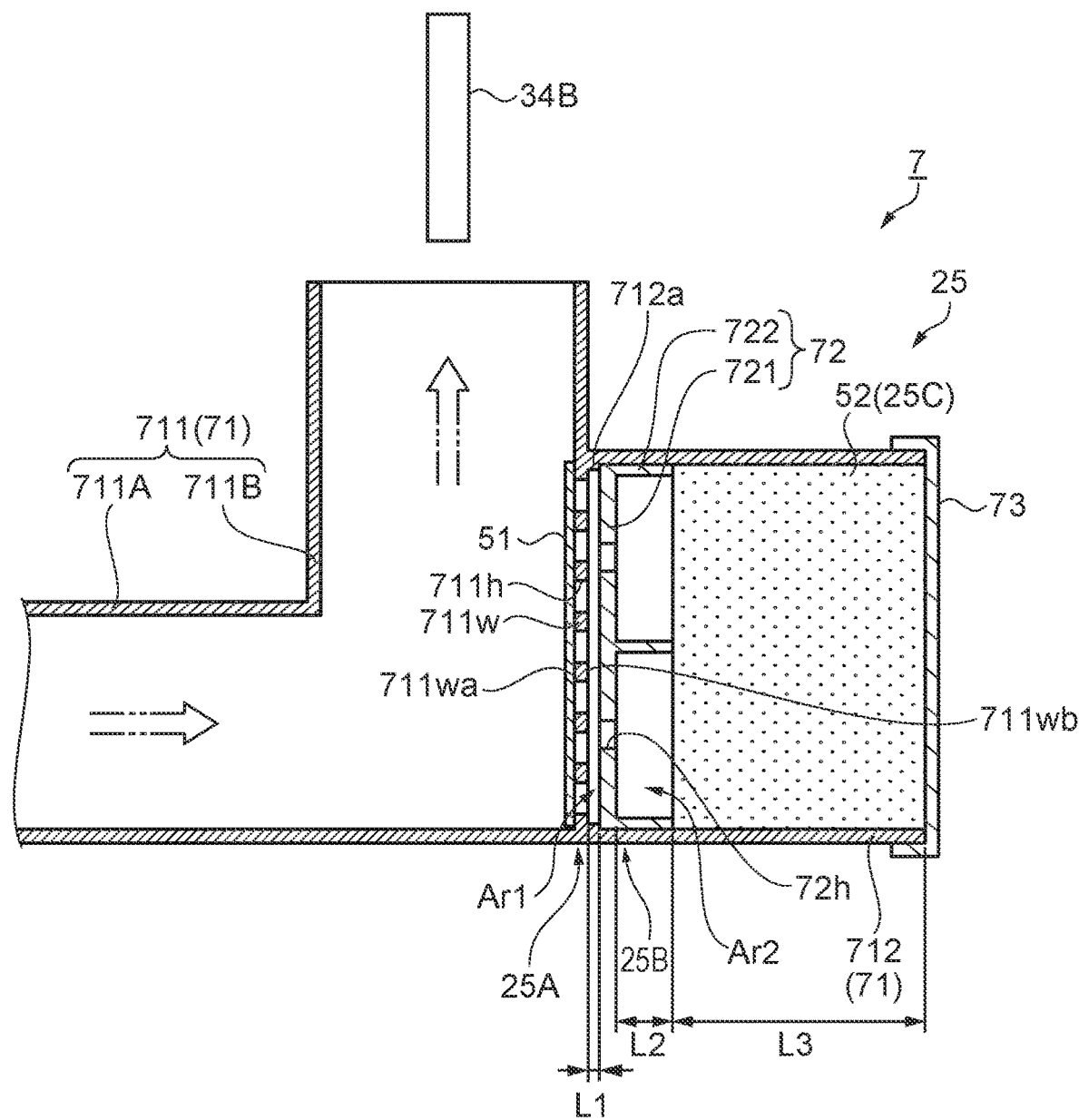
FIG. 12 is a sectional view of the duct unit in the third embodiment.

FIG. 11 is an exploded perspective view of the duct unit 7. FIG. 12 is a sectional view of the duct unit 7.

The cooling fan 45 is configured by a scirocco fan that delivers, in a rotation tangential direction, the air taken in from a direction along a center axis of a rotating blade (a rotating body). The cooling fan 45 is equivalent to the rotating device including the rotating body.

The duct unit 7 includes, as shown in FIG. 11 and FIG. 12, a duct member 71, the thin film 51, a frame body 72, the porous material 52, and a holding frame 73. A sound absorber 25 in this embodiment is configured by a part of the duct member 71, the thin film 51, the frame body 72, the porous material 52, and the holding frame 73. Note that the thin film 51 and the porous material 52 have sizes different from the sizes of the thin film 51 and the porous material 52 explained in the first embodiment. That is, in this embodiment, the sound absorber 25 is directly attached to the duct member 71 configuring a channel. The duct member 71 and the sound absorber 25 are integrated.

The duct member 71 includes, as shown in FIG. 10, a channel forming section 711 disposed on an air delivery port side of the cooling fan 45 and a housing section 712 projecting to the opposite side of the cooling fan 45 with respect to the channel forming section 711.

In the channel forming section 711, a channel for guiding the air blown from the cooling fan 45 to the light modulating device 34B is formed on the inside. The channel forming section 711 is formed in a rectangular shape in a cross section. The channel forming section 711 includes, as shown in FIGS. 10 and 12, a linear section 711A extending from an air delivery port of the cooling fan 45 in a direction in which the cooling fan 45 delivers the air and a bent section 711B bent upward from the linear section 711A and configured to guide the air flowing in the linear section 711A to the light modulating device.

The channel forming section 711 includes an erected wall 711w (see FIGS. 11 and 12) opposed to the air delivery port of the cooling fan 45. The erected wall 711w configures a part of a wall section forming the channel in the channel forming section 711. A plurality of first holes 711h are formed in the erected wall 711w. The erected wall 711w is equivalent to the first wall section. The erected wall 711w includes, as shown in FIG. 12, a first surface 711wa on the cooling fan 45 side and a second surface 711wb on the opposite side of the first surface 711wa.

The housing section 712 is formed in a tubular shape to surround the plurality of first holes 711h. The housing section 712 projects to the opposite side of the linear section 711A from the erected wall 711w. The opposite side of the erected wall 711w is opened. The housing section 712 is formed in a rectangular shape in a cross section. At a corner section formed by the inner surface of the housing section 712 and the erected wall 711w, as shown in FIG. 12, a step section 712a projecting from the erected wall 711w is formed. On the outer surface of the housing section 712, as shown in FIG. 10, a pair of boss sections 712b including screw holes (not shown in FIG. 10) is formed. The holding frame 73 explained below is fixed to the pair of boss sections 712b by screws.

As shown in FIGS. 11 and 12, the thin film 51 is stuck to the first surface 711wa of the erected wall 711w to close the plurality of first holes 711h.

The frame body 72 includes, as shown in FIGS. 11 and 12, a tabular section 721 having a rectangular shape in plan view and side surface sections 722 projecting from sides of the tabular section 721. That is, the frame body 72 is formed in a rectangular parallelepiped shape opened on the opposite side of the tabular section 721. The frame body 72 is housed in the housing section 712 of the duct member 71 to place the opening side on the opposite side of the erected wall 711w. The frame body 72 is formed in size in contact with the step section 712a in the housing section 712. Second holes 72h are formed in the tabular section 721. In this way, the tabular section 721 is disposed to be opposed to the second surface 711wb of the erected wall 711w and is equivalent to the second wall section. The number of the first holes 711h is set larger than the number of second holes 72h.

As shown in FIGS. 11 and 12, the porous material 52 is formed in a rectangular parallelepiped shape, housed in the housing section 712 in which the frame body 72 is housed, and formed in size in contact with the side surface section 722 of the frame body 72.

The holding frame 73 includes a lid-like section 731 configured to close the opening section of the housing section 712 and protrusion sections 732 projecting from the lid-like section 731 and corresponding to the pair of boss sections 712b. In the protrusion sections 732, screw insert-through holes corresponding to the screw holes of the boss sections 712b are formed. The holding frame 73 is fixed by screws to the housing section 712 in which the frame body 72 and the porous material 52 are housed. Note that, before the holding frame 73 is fixed to the housing section 712, the porous material 52 is formed in size slightly projecting from the housing section 712.

As shown in FIG. 12, the holding frame 73 is fixed to the housing section 712, whereby the frame body 72 and the porous material 52 are disposed in predetermined positions. Specifically, the frame body 72 is pressed by the porous material 52 and disposed in contact with the step section 712a. The porous material 52 is disposed between the side surface section 722 of the frame body 72 and the lid-like section 731 of the holding frame 73. The tabular section 721 of the frame body 72 is disposed to have the interval L1 between the tabular section 721 and the erected wall 711w and have the interval L2 between the tabular section 721 and the porous material 52. That is, in the housing section 712, the first space Ar1 is provided between the erected wall 711w (the first wall section) and the tabular section 721 (the second wall section) and the second space Ar2 is provided between the tabular section 721 (the second wall section) and the porous material 52. The porous material 52 has length L3 in a direction away from the tabular section 721. The intervals L1 and L2 and the length L3 have a relation of L1<L2<L3.

The sound absorber 25 is configured by the thin film 51, the erected wall 711w, the housing section 712, the frame body 72, the porous material 52, and the holding frame 73.

The sound absorber 25 includes a first sound absorbing section 25A configured by the erected wall 711w (the first wall section) to which the thin film 51 is stuck and the first space Ar1, a second sound absorbing section 25B configured by the tabular section 721 (the second wall section) and the second space Ar2, and a third sound absorbing section 25C configured by the porous material 52. In the sound absorber 25, the first sound absorbing section 25A, the second sound absorbing section 25B, and the third sound absorbing section 25C are disposed in this order in a direction away from the cooling fan 45.

The air delivered from the cooling fan 45 flows in the channel in the linear section 711A. A traveling direction of the air is changed by the erected wall 711w and the thin film 51. The air is blown from the channel in the bent section 711B to the light modulating device 34B to cool the light modulating device 34B.

On the other hand, noise such as operation sound and wind noise involved in the driving of the cooling fan 45 is reduced by the sound absorber 25.

In this way, the sound absorber 25 is provided in the duct unit 7 and reduces noise involved in the driving of the cooling fan 45.

As explained above, according to this embodiment, effects described below can be obtained.

The sound absorber 25 is configured using a part of the wall section forming the channel in which the air blown from the cooling fan 45 circulates. Consequently, the sound absorber 25 is capable of efficiently reducing not only operation sound of the cooling fan 45 but also wind noise of the air blown from the cooling fan 45.

Fourth Embodiment

A sound absorber according to a fourth embodiment is explained with reference to the drawings.

The sound absorber 25 in the third embodiment is disposed on the extension in the direction in which the air from the cooling fan 45 travels in the duct unit 7. However, a sound absorber 105 in this embodiment is disposed in a position different from this position. Note that, in the following explanation, the same components as the components of the duct unit 7 in the third embodiment are denoted by the same reference numerals and signs and detailed explanation of the configuration is omitted or simplified.

Figure 13:
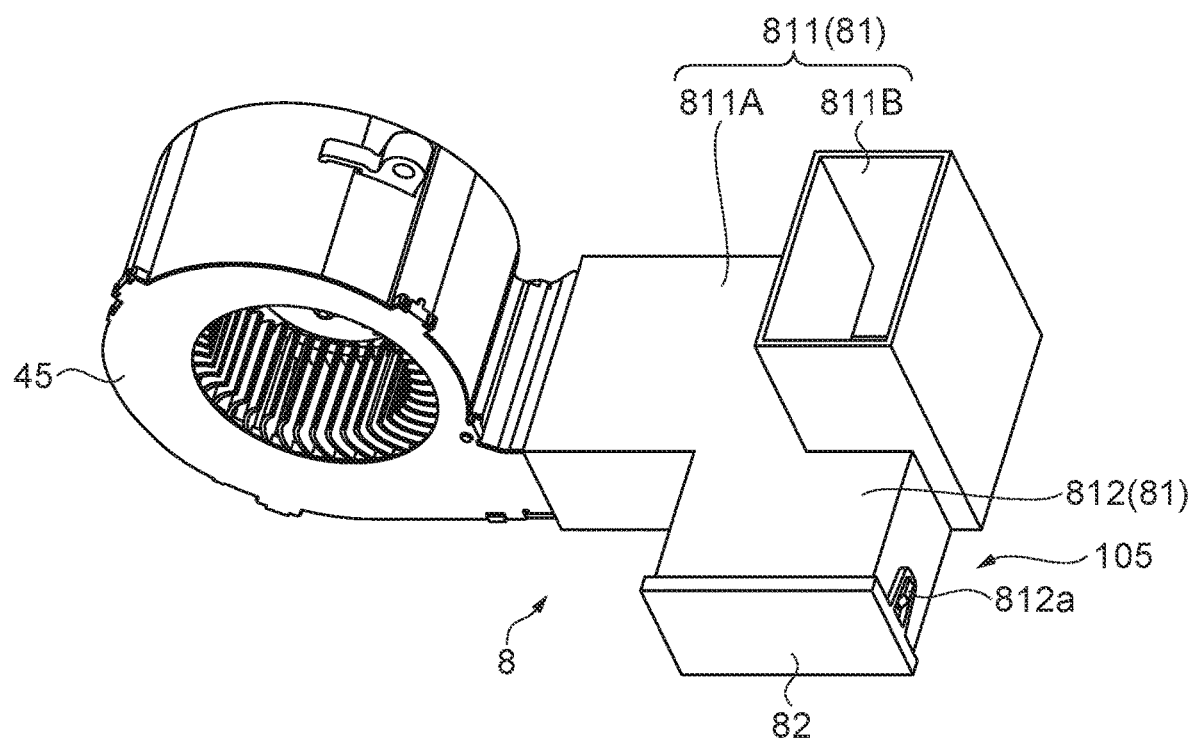
FIG. 13 is a perspective view schematically showing a duct unit and a cooling fan in a fourth embodiment.
Figure 14:
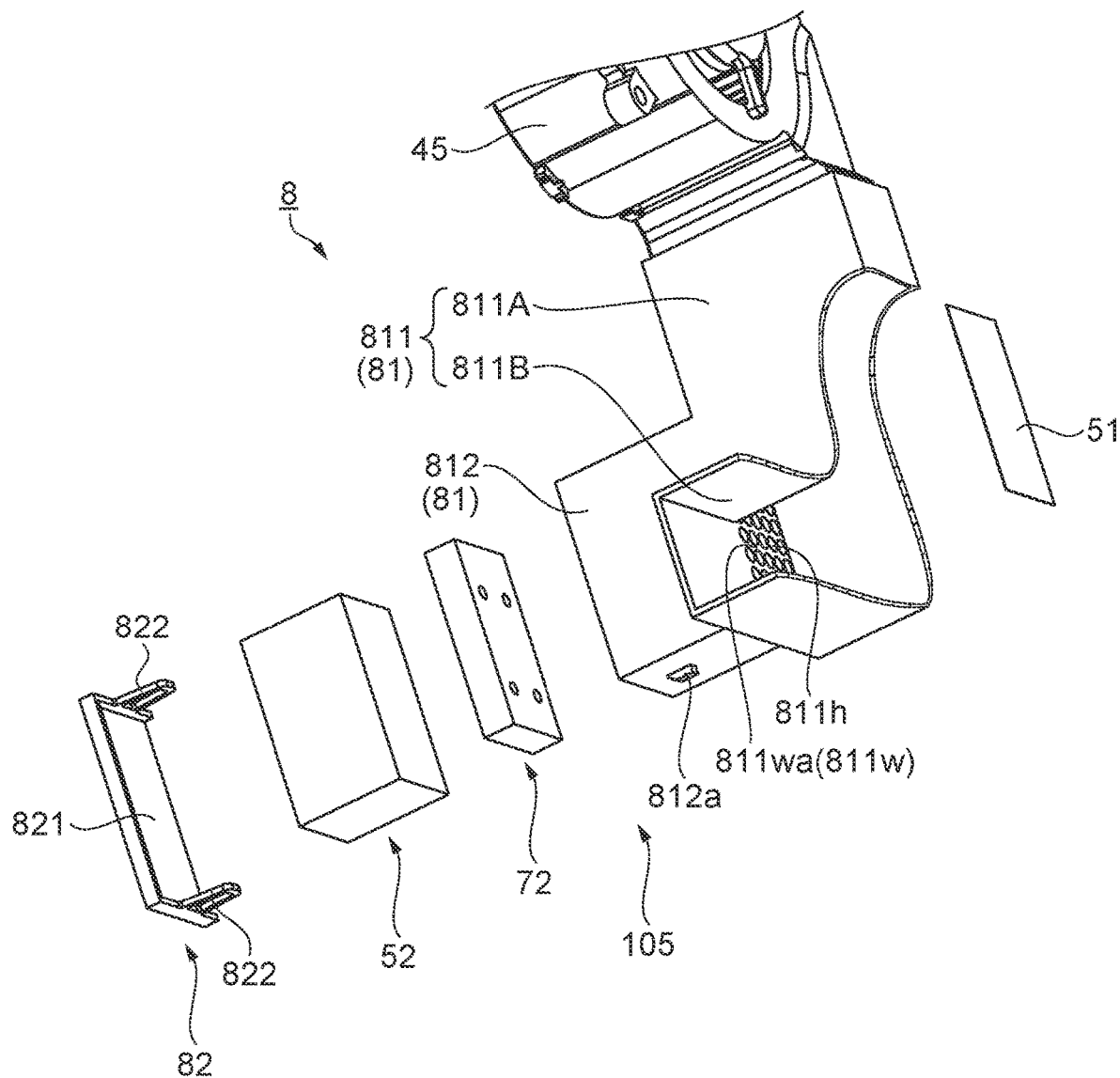
FIG. 14 is an exploded perspective view of the duct unit in the fourth embodiment.

FIG. 13 is a perspective view schematically showing a duct unit 8 and the cooling fan 45 in this embodiment. FIG. 14 is an exploded perspective view of the duct unit 8.

The duct unit 8 includes, as shown in FIGS. 13 and 14, a duct member 81 having a shape different from the shape of the duct member 71 in the third embodiment, a holding frame 82 having a shape different from the shape of the holding frame 73 in the third embodiment, and the thin film 51, the frame body 72, and the porous material 52 same as those in the third embodiment.

The duct member 81 includes a channel forming section 811 configured to guide the air blown from the cooling fan 45 to the light modulating device 34B and a housing section 812 projecting from the channel forming section 811.

Like the channel forming section 711 in the third embodiment, the channel forming section 811 includes a linear section 811A having a rectangular shape in a cross section and a bent section 811B. A channel is formed on the inside of the channel forming section 811.

In a part of a sidewall of the linear section 811A, as shown in FIG. 14, a plurality of first holes 811h are formed.

The housing section 812 is formed in a tubular shape to surround the plurality of first holes 811h and projects in a direction different from the direction of the bent section 811B. The housing section 812 is formed in a rectangular shape in a cross section opened on the opposite side of the plurality of first holes 811h. The part surrounded by the housing section 812 where the plurality of first holes 811h are formed in the side wall of the linear section 811A is a first wall section 811w. The first wall section 811w configures a part of a wall section forming the channel in the channel forming section 811.

The first wall section 811w includes, as shown in FIG. 14, a first surface 811wa on a side where the air from the cooling fan 45 circulates and a second surface (not shown in FIG. 14) on the opposite side of the first surface 811wa. In this way, the housing section 812 extends in a direction crossing a direction in which the air delivered from the cooling fan 45 circulates.

On the outer surface of the housing section 812, as shown in FIGS. 13 and 14, a pair of projecting sections 812a for fixing the holding frame 82 is formed.

As shown in FIG. 14, the thin film 51 is stuck to the first surface 811wa of the first wall section 811w to close the plurality of first holes 811h.

The holding frame 82 includes a lid-like section 821 configured to close the opening section of the housing section 812 and a pair of hook sections 822 configured to project from the lid-like section 821 and engage with the pair of projecting sections 812a. The pair of hook sections 822 engages with the pair of projecting sections 812a, whereby the holding frame 82 is fixed to the housing section 812 in which the frame body 72 and the porous material 52 are housed.

The holding frame 82 is fixed to the housing section 812, whereby the frame body 72 and the porous material 52 are disposed in predetermined positions. The sound absorber 105 in this embodiment is configured by the thin film 51, the first wall section 811w, the housing section 812, the frame body 72, the porous material 52, and the holding frame 82.

In the sound absorber 105, the first sound absorbing section, the second sound absorbing section, and the third sound absorbing section are disposed in this order in a direction away from the linear section 811A.

The air delivered from the cooling fan 45 circulates in the channel in the channel forming section 811 and cools the light modulating device 34B.

On the other hand, noise such as wind noise and vibration noise involved in the driving of the cooling fan 45 is reduced by the sound absorber 105.

As explained above, according to this embodiment, effects described below can be obtained.

(1) Like the sound absorber 25 in the third embodiment, the sound absorber 105 is capable of efficiently reducing not only operation sound of the cooling fan 45 but also wind noise of the air blown from the cooling fan 45.

(2) The sound absorber 105 projects in a direction different from the direction of the sound absorber 25 in the third embodiment. Therefore, in a projector including the duct unit 8, the configuration of member disposition around the duct unit 8 can be a configuration different from the configuration of member disposition around the duct unit 7 in a projector including the duct unit 7.

Fifth Embodiment

A projector according to a fifth embodiment is explained with reference to the drawings.

The projector in this embodiment includes a second cooling device configured to cool the light modulating devices 34 with circulation of liquid and a sound absorber disposed near the second cooling device. The second cooling device in this embodiment circulates the liquid between the second cooling device and holding sections (in the embodiments explained above, not shown in the figures), which hold liquid crystal panels of the light modulating devices 34, to cool the liquid crystal panels.

Figure 15:
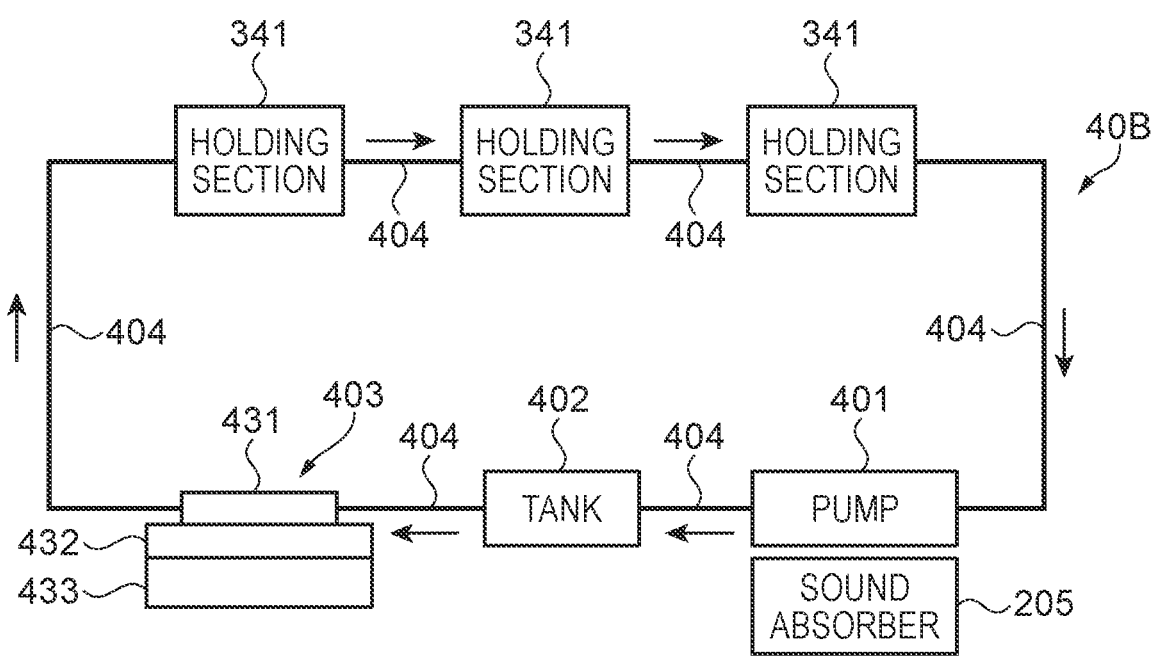
FIG. 15 is a schematic diagram showing a main configuration of a second cooling device and a sound absorber in a fifth embodiment.

FIG. 15 is a schematic diagram showing a main configuration of a second cooling device 40B and a sound absorber 205 in this embodiment.

The second cooling device 40B includes, as shown in FIG. 15, a pump 401, a tank 402, a heat exchange device 403, and a plurality of tubular members 404. Holding sections 341 configured to hold liquid crystal panels are provided to respectively correspond to liquid crystal panels for color lights. Channels in which liquid flows are provided on the insides of the holding sections 341. The pump 401, the tank 402, the heat exchange device 403, and the plurality of tubular members 404 and the holding sections 341 for the color lights form a circulation channel in which the liquid circulates.

The pump 401 includes a not-shown motor (rotating device) and the like. The pump 401 sucks and pressure-feeds the liquid and circulates the liquid to the circulation channel.

The tank 402 temporarily accumulates the liquid on the inside and supplies the liquid to the circulation channel. Note that, as the liquid used in this embodiment, water, ethylene glycol, and the like can be illustrated.

The heat exchange device 403 includes a heat receiving section 431, a thermoelectric conversion element 432, and a heat radiating section 433.

The heat receiving section 431 includes, on the inside, for example, a plurality of fine channels (not shown in FIG. 15) in which the liquid circulates. The heat receiving section 431 receives heat from the liquid flowing in the fine channels. The thermoelectric conversion element 432 includes, for example, a Peltier element and moves the heat of the heat receiving section 431. The heat radiating section 433 radiates the heat moved by the thermoelectric conversion element 432.

The plurality of tubular members 404 are members having flexibility and are formed in a tubular shape, on the inside of which the liquid circulates. The plurality of tubular members 404 annularly connect the members (the holding sections 341, the pump 401, the tank 402, and the heat receiving section 431). Note that, in FIG. 15, a configuration is shown in which three holding sections 341 are connected in series. However, a configuration may be adopted in which the three holding sections 341 are connected in parallel.

Although detailed illustration is omitted, the sound absorber 205 has the same configuration as the configuration of the sound absorber 5 explained in the first embodiment. That is, the sound absorber 205 includes a first sound absorbing section configured by a first wall section to which a thin film is stuck and a first space, a second sound absorbing section configured by a second wall section and a second space, a third sound absorbing section configured by a porous material. As shown in FIG. 15, the sound absorber 205 is disposed near the pump 401 and reduces noise involved in driving of the pump 401.

As explained above, according to this embodiment, the projector includes the sound absorber 205 disposed near the pump 401. Therefore, noise involved in the driving of the pump 401 is reduced. Therefore, it is possible to provide the projector capable of reducing noise while preventing deterioration in the quality of a projected image due to cooling of the light modulating devices 34.

Modifications

Note that the invention is not limited to the embodiments explained above. Various changes, improvements, and the like can be added to the embodiments. Modifications are explained below.

The porous material 52 in the embodiments is not limited to the rectangular parallelepiped shape and may have a shape having unevenness or a shape having a curved surface.

In the third embodiment and the fourth embodiment, the configuration is explained in which the duct units 7 and 8 guide the air delivered from one cooling fan 45 to one cooling target. However, a duct unit that guides the air delivered from one or a plurality of cooling fans to a plurality of cooling targets may be configured. The duct unit may include a plurality of sound absorbers.

In the embodiments, the configuration is explained in which the thin film 51 is stuck to the first surface of the first wall section. However, a configuration may be adopted in which the thin film 51 is stuck to the second surface of the first wall section. In the case of this configuration, the second wall section is disposed to be opposed to the first wall section via the thin film 51.

The wavelength converting device 304 in the first embodiment is configured such that the wavelength conversion element 304a rotates. However, a configuration of a fixed type in which the wavelength conversion element 304a is not rotated may be adopted.

The projector 1 in the embodiments adopts a so-called three plate system including the three light modulating devices 34R, 34G, and 34B corresponding to the red light LR, the green light LG, and the blue light LB. However, the projector 1 is not limited to this and may adopt a single plate system. Alternatively, the projector 1 may include two or four or more light modulating devices 34.

The light modulating devices 34 are not limited to the liquid crystal panel of the transmission type. A liquid crystal panel of a reflection type or a device of a micromirror type, for example, a DMD (Digital Micromirror Device) may be used in the light modulating devices 34.

The light source device 310 in the embodiments includes the semiconductor lasers. However, the light source device 310 is not limited to the semiconductor lasers and may include light emitting diodes or a discharge type laser.

The entire disclosure of Japanese Patent Application No. 2017-200120, filed on Oct. 16, 2017 is expressly incorporated by reference herein.

What is claimed is:

1. A sound absorber comprising:
a first wall section in which a plurality of first holes are provided, the first wall section including a first surface and a second surface;
a film stuck to the first surface or the second surface of the first wall section;
a second wall section opposed to the second surface and provided in a position separated from the second surface, at least one second hole being provided in the second wall section;
a porous material provided to be opposed to the second wall section in a position separated from the second wall section;
a first sound absorbing section configured by the film which is stuck to the first surface or the second surface of the first wall section and a first space which is provided between the first wall section and the second wall section, to absorb a part of a sound wave with vibration of the film;
a second sound absorbing section configured by a Helmholtz resonator which is comprised of a second space which is provided between the second wall and the porous material; and
a third sound absorbing section configured by the porous material.

2. The sound absorber according to claim 1, wherein
the sound absorber has a rectangular parallelepiped shape,
the first wall section is a side surface section forming one surface of the rectangular parallelepiped shape,
the second wall section is a partition wall provided on an inside of the rectangular parallelepiped shape, and
the porous material is disposed on the inside of the rectangular parallelepiped shape.

3. The sound absorber according to claim 1, wherein a number of the first holes is larger than a number of the second holes.

4. The sound absorber according to claim 1, wherein, when an interval between the first wall section and the second wall section is represented as L1 and an interval between the second wall section and the porous material is represented as L2, the intervals L1 and L2 have a relation of L1<L2.

5. The sound absorber according to claim 4, wherein, when length of the porous material in a direction away from the second wall section is represented as L3, the interval L2 and the length L3 have a relation of L2<L3.

6. The sound absorber according to claim 1, wherein the porous material is formed of at least of glass wool, urethane, felt, polypropylene, and rock wool.

7. The sound absorber according to claim 1, wherein the film includes a resin layer and an adhesive layer, and thickness of the resin layer is smaller than thickness of the adhesive layer.

8. A projector including a light source, a light modulating device, and a projection lens, the projector comprising:
- a rotating device including a rotating body; and
- the sound absorber according to claim 1.

9. A projector including a light source, a light modulating device, and a projection lens, the projector comprising:
- a rotating device including a rotating body; and
- the sound absorber according to claim 2.

10. A projector including a light source, a light modulating device, and a projection lens, the projector comprising:
- a rotating device including a rotating body; and
- the sound absorber according to claim 3.

11. A projector including a light source, a light modulating device, and a projection lens, the projector comprising:
- a rotating device including a rotating body; and
- the sound absorber according to claim 4.

12. A projector including a light source, a light modulating device, and a projection lens, the projector comprising:
- a rotating device including a rotating body; and
- the sound absorber according to claim 5.

13. A projector including a light source, a light modulating device, and a projection lens, the projector comprising:
- a rotating device including a rotating body; and
- the sound absorber according to claim 6.

14. A projector including a light source, a light modulating device, and a projection lens, the projector comprising:
- a rotating device including a rotating body; and
- the sound absorber according to claim 7.

15. The projector according to claim 8, wherein
the rotating device is a cooling fan,
the projector further comprises a channel for guiding air delivered from the cooling fan to a cooling target in the projector,
the sound absorber is attached to the channel, and
the first wall section of the sound absorber configures a part of a wall section forming the channel.

* * * * *